United States Patent
Kanevsky et al.

(10) Patent No.: US 6,505,208 B1
(45) Date of Patent: Jan. 7, 2003

(54) EDUCATIONAL MONITORING METHOD AND SYSTEM FOR IMPROVING INTERACTIVE SKILLS BASED ON PARTICIPANTS ON THE NETWORK

(75) Inventors: Dimitri Kanevsky, Ossining, NY (US); Alexander Zlatsin, Yorktown Heights, NY (US); Clifford Alan Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/329,128

(22) Filed: Jun. 9, 1999

(51) Int. Cl.[7] ............................................. G06F 17/30
(52) U.S. Cl. ...................................................... 707/102
(58) Field of Search .................... 434/1–432; 707/1–100

(56) References Cited
U.S. PATENT DOCUMENTS 5,909,589 A * 6/1999 Parker et al. ................. 712/32

* cited by examiner

*Primary Examiner*—Diane D. Mizrahi
*Assistant Examiner*—Apu M Mofiz
(74) *Attorney, Agent, or Firm*—Scully, Scott, Murphy & Presser; Daniel P. Morris, Esq.

(57) ABSTRACT

The educational system recommends to users, a most efficient manner of accomplishing tasks achievable by computing devices. The system detects command sequences executed by users during an interaction with computing devices distributed over a network in an attempt to achieve a certain goal. The command sequences are segmented, each segment is labeled with a goal identifying purpose mark, a cost of each segment is computed. The detected command sequences are then compared with the command sequences detected previously and the descriptions of the more efficient command sequences are provided to the users utilizing the less effective approaches. The detected command sequence is stored in place of less efficient of the command sequences and where no prior command sequences has been previously stored.

35 Claims, 5 Drawing Sheets

EDUCATIONAL MONITORING METHOD AND SYSTEM FOR IMPROVING INTERACTIVE SKILLS BASED ON PARTICIPANTS ON THE NETWORK

BACKGROUND OF THE INVENTION

1. Field of the Invention

The invention relates to education and guidance of users of computing devices, and more specifically to an automatic comparison and evaluation of methods followed by various users to fulfill an identical goal and the determination of most effective method.

2. Description of Prior Art

With the advent of computers and embedded devices and the incredible growth of the number of personal computer users, it is becoming increasingly more difficult to teach users the most efficient ways of interacting with the software applications running on the various hardware platforms.

Currently, to familiarize themselves with the workings of the application components, the computer users may read an invariably weighty User's Manual book, purchase and view a videotape on the subject, take a class, or as commonly done, simply start using the application referring to the application's Help subsystem when necessary.

None of the instances above, are guaranteed to teach a novice or an expert user the most optimal sequence of steps to perform a task. Additionally, considering the sheer volume of new and presently used computer applications being offered for sale and use, i.e., over Internet, every month, a way is needed to teach the users how to operate those applications.

What is needed is a system to inform computer users of the most efficient way to perform individual application tasks and functions.

SUMMARY OF THE INVENTION

The inventive educational system monitors all user actions when they interact with applications being executed on devices such as personal computers, laptop, palmtops, controllers, telephones, etc. The system measures and computes the number of steps or actions that are applied by the user to achieve some result, such as mouse clicks and keyboard strokes used for finding and opening of files, sending of an email, a broadcast message and for telephone dialing to connect to Internet or to talk to a person. Additionally, other factors such as the amount of distance a mouse was dragged in a step, a type of input entry in the step taken, e.g., mouse click, keyboard entry, and/or pull down menu selection are considered in computing the most optimal sequence of steps for performing a task. The computations are then stored, for example on a disk or in memory of the device.

The stored results are compared to those of other users, to determine whether different users are applying different number and types of actions to achieve the same goal, e.g., opening a file. From each of the results, a most optimal approach is determined and a description of the most optimal approach is then sent to the less skillful users.

The inventive educational monitoring system interprets user actions and ascertains, when identical tasks are performed by users through the use of a semantic module described in a commonly owned, co-pending U.S. patent application Ser. No. 09/078,807 now U.S. Pat. No. 6,236,968, entitled "Sleep Prevention Dialogue Based Car System", filed on May 14, 1998, the whole contents disclosure of which are incorporated herein by reference. A counting module is used to split user actions into sub-steps, classify these sub steps, and to measure complexity of actions in terms of the complexity of chains of the sub step classes. For example, a value one (1) may be assigned to such steps as clicking a mouse button, hitting a key on a keyboard etc., thus a complexity of a user action to open some file would be a number of hits and clicking that a user spent to find and open a file.

As an example, please consider a situation where two users of an identical system are performing a file open command. One user may type a name of the file to open it, another user may find the name of the file in a special window and click on it. Based on the evaluation described above, if the system determines that the second user is more efficient, the first user will be notified and/or guided through the more efficient steps to take for achieving the file open. The notification and guidance may be in a form of a pop-up menu displayed on the first user's screen and describing the steps as taken by the second user. The notification and guidance also may include one or more graphical feedbacks such as highlighting of icons, menu tool bars, and other window objects to guide the first user to the optimal steps.

The strings of actions having least complexity are then stored in a central educational database, and are used as referenced prototypes for comparison with other user actions. If the same operation is later determined to be performed more efficiently, the new, more efficient string of actions is then stored in a database. Furthermore, the referenced prototype of string actions may be introduced in the database by the human experts.

BRIEF DESCRIPTION OF DRAWINGS

The foregoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several views, and in which.

DETAILED DESCRIPTION OF THE INVENTION

Figure 1:
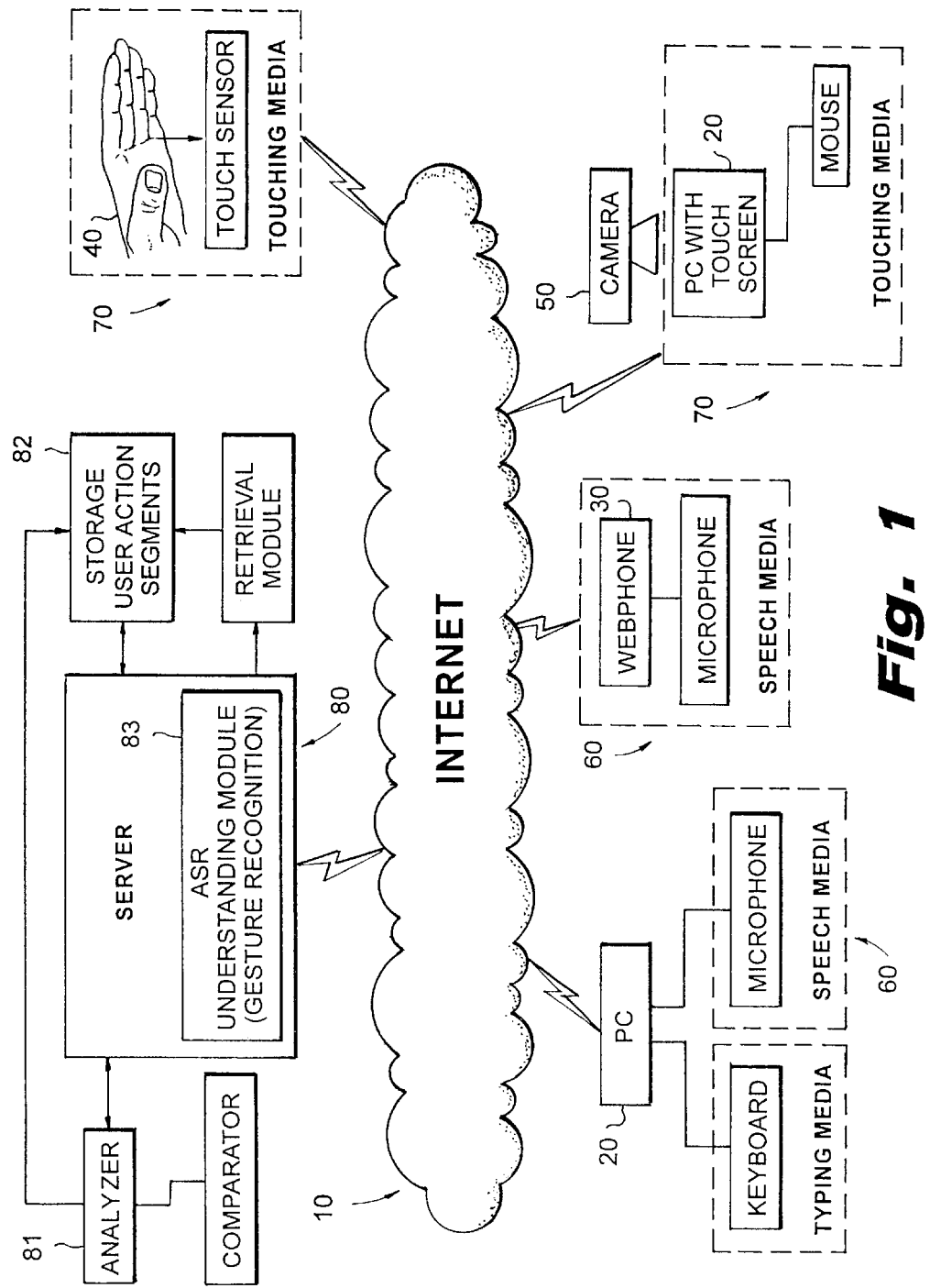
FIG. 1 is the overview of a network layout of the present invention.

The inventive educational system, shown in FIG. 1, is distributed over a network 10 of computing devices such as all types of computers 20, traditional, cellular and digital phones 30, palmtop computers 40, and other household appliances with imbedded controllers, such as televisions, record, tape and CD players, radios, clocks, watches, pens, refrigerators, stoves microwave ovens etc. The network of the present invention may consist of homogenous networks e.g., Internet, Extranet, Intranet, LAN, telephone network, wireless network, satellite network, infrared network, as well as any combination thereof.

The system may employ visual 50, audio 60 touch sensitive 70, as well as infrared, heat, and power on/off switch components having software sensors for detecting user actions, when any user interacts with any of the distributed computing devices, are provided. User actions may include voice commands, gestures, computer mouse clicks, computer keyboard strokes, touch-sensitive device touches and other.

Figure 2:
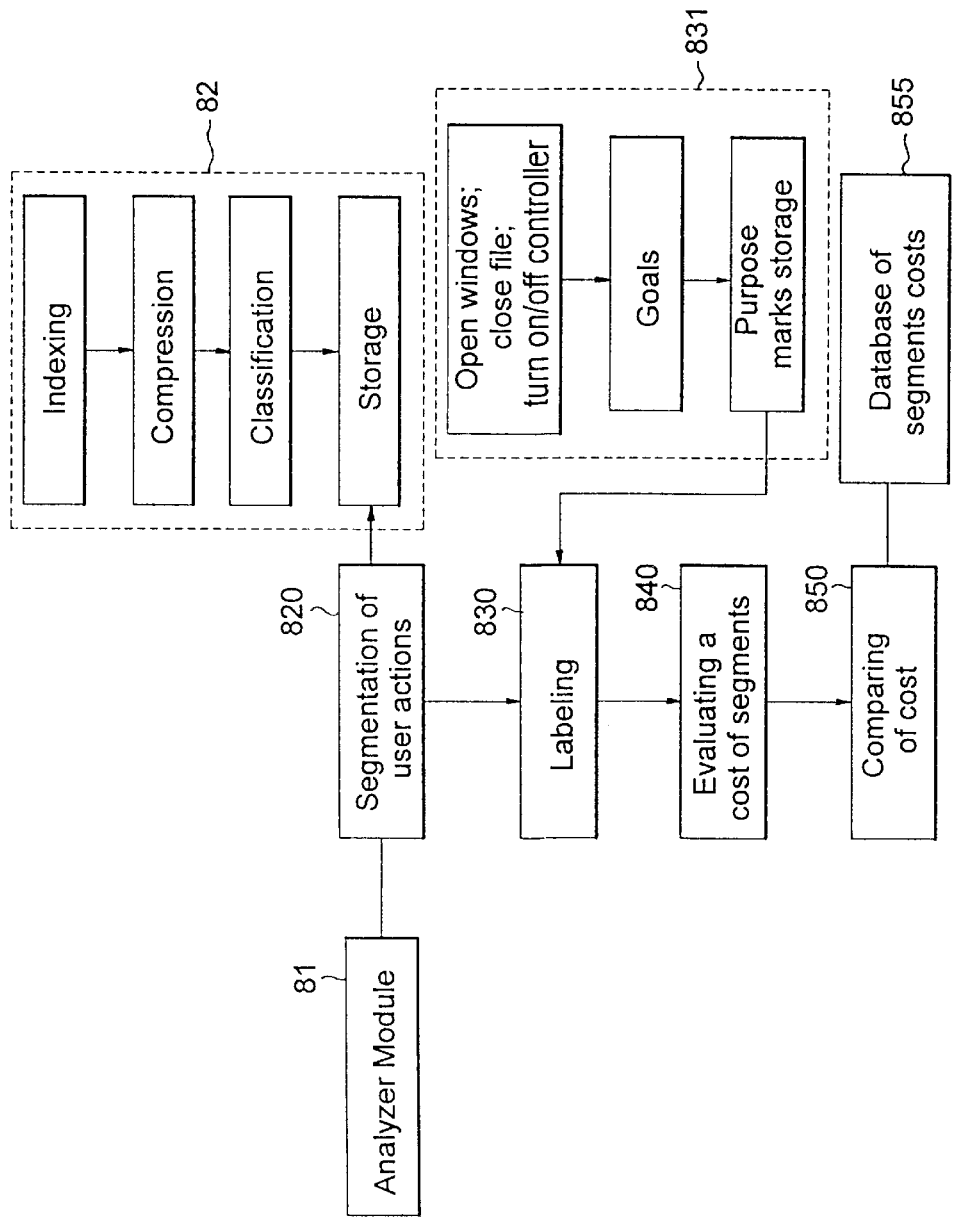
FIG. 2 is a flowchart of logical steps of the analyzing part of the present invention.

The data collected by sensors and collected at a server 80 is then analyzed by module 81. FIG. 2 shows the workings of the analyze module 81. First, the user actions needed to achieve some goal are segmented at step 820 into user action segments. Each user actions segment is then labeled at step 830 with a purpose mark to denote one or several reasons for a user to perform this particular action. A stored list of purpose marks 831 contains the reasons for the user performed actions including: opening a terminal window, opening a file, closing a file, executing icons, performing searches, executing operating system or application commands, turning off devices, finding a network channel, activating some command sequences to perform user action sequences.

Figure 3:
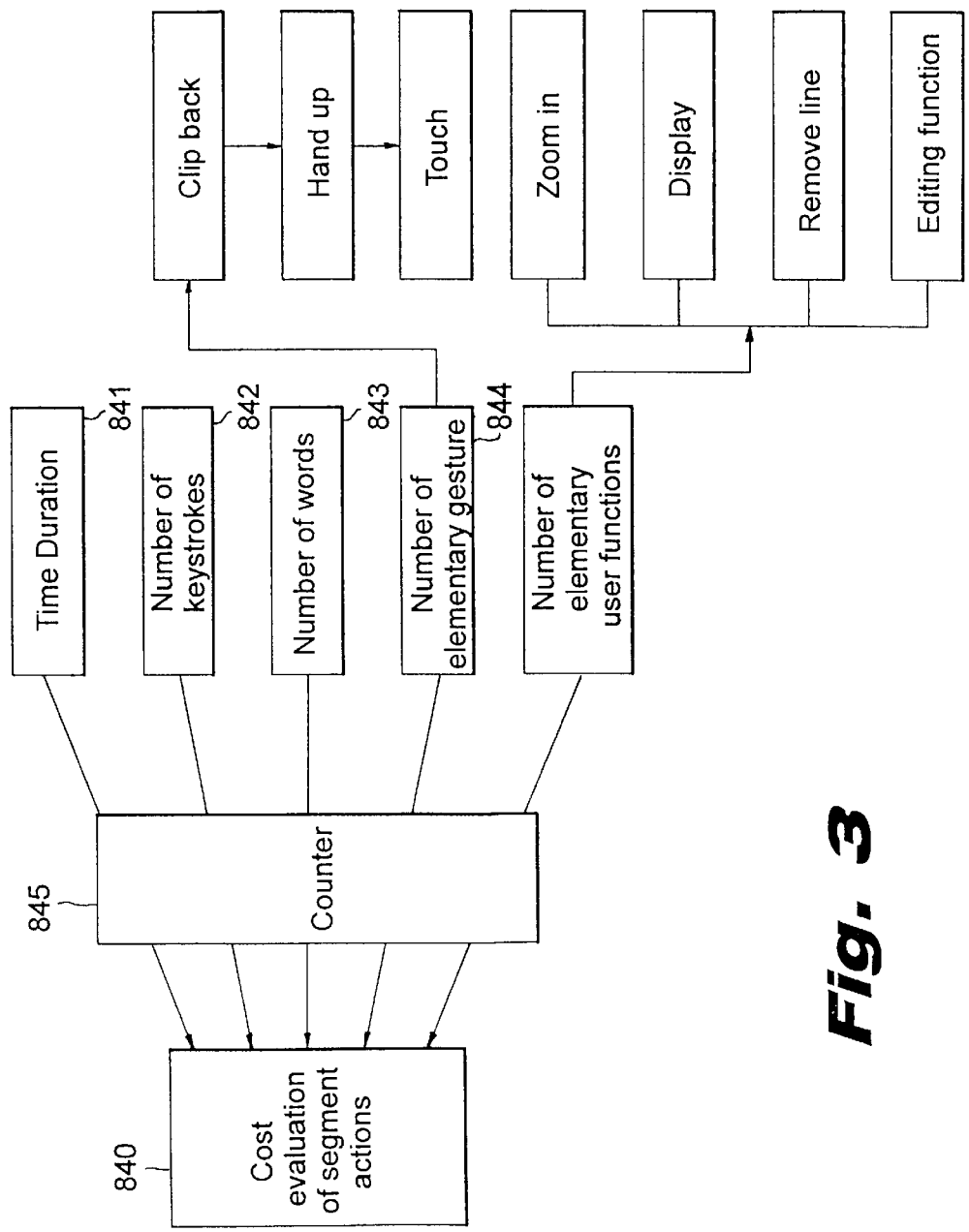
FIG. 3 is a logical representation of the cost of segment evaluation.

In FIG. 3, the cost of each user action segment is computed at step 840 by using a counter 845 and estimating for example the complexity, length of the segment, amount of distance a mouse is dragged, a type of input entry such as a key press or mouse click, and the number of action units into which the action segment may be split. The cost of an action segment may be estimated as the complexity or duration of the segment, and the number of action units into which this action segment may be split.

Action units may be keystrokes, 841, words or phonetic groups in a spoken phrase 842, elementary gestures 843 such as those described in a commonly owned, co-pending U.S. patent application Ser. No. 09/079,754 now U.S. Pat. No. 6,421,453, entitled "Apparatus And Methods For User Recognition Employing Behavioral Passwords", filed on May 15, 1998, the whole contents disclosure of which are incorporated herein by reference, and the elementary user functions 844 including zooming in on an icon, displaying top-down/up menus, opening and closing files, editing functions, making graphic facilities functions, and drawing a geometric figure. For example, a file open may contain the following action units:

1. Click on a WordPro icon;
2. Click to select "SmartMaster";
3. Click O.K.;
4. Click "File Open";
5. Click to select a file name; and
6. Click on "Open".

Furthermore, action units may constitute pressing a sequence of keys on a keyboard, a selection of buttons on an input device or positions on a touch screen, a sequence of sounds spoken into a audio input apparatus, a sequence of gestures made into a camera and movements and clicks of a computer mouse. Each action segment is comprised of a beginning and an end. The end of the action segment is the event of the user goal achievement. The beginning of the action segment is a first event necessary to start a given segment action leading to the segment action goal. The first event for the given segment action is started when the end of the previous segment action is reached, it is the onset of a moment when the user turns on or starts to operate in some medium. The medium may include speech, typing, making gestures, or moving of the computer mouse. The user starting to speak, moving of the mouse, making gestures, typing is the beginning of medium.

The user action segments are then indexed, compressed, classified and stored, as described in the above referenced U.S. patent application Ser. No. 09/079,754, by module 82 (FIG. 2) and data from different users is compared at step 850 (FIG. 2). The comparison of data may involve the comparison of the purpose mark labels for different action segments and the comparison of cost of action segments having the same purpose marks. The compared action segments may be from the same user performing the same command differently at different times, or from different users.

Figure 4:
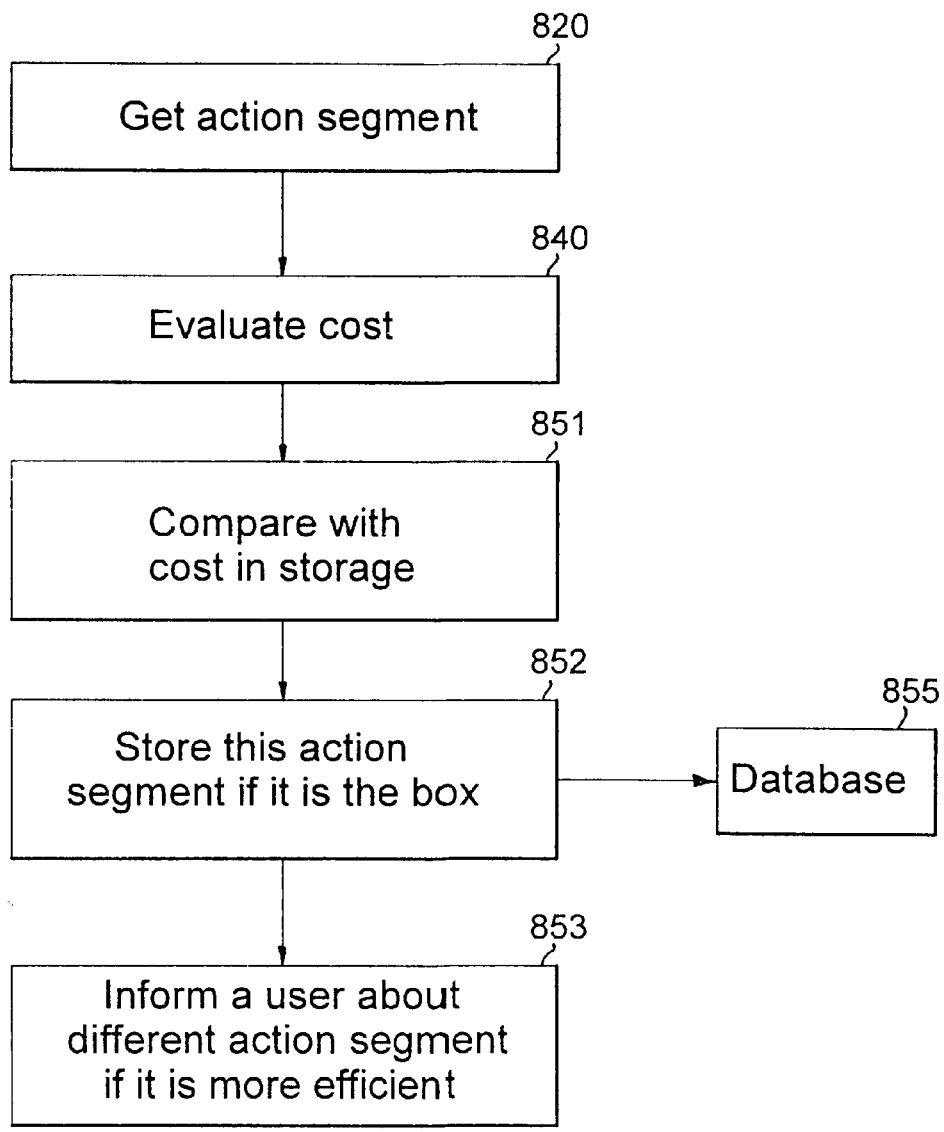
FIG. 4 is a logical representation of the cost comparison between a determined and a previously stored action segments.

FIG. 4 shows the flow of the prototyping and retrieval steps of the present invention. After determining the user action segment at step 820 and evaluating its cost at step 840, the user action segment is matched with the previously stored action segment at step 851. All user action segments produced at any time are compared with the stored segment action. At step 852, if the new user segment action is determined to be more efficient then the stored ones, the new user segment action is stored in place of the old. If a user segment action having the same purpose mark, was never before performed and stored, the present user segment action is stored in a database 855. The user segment action may also be pre-loaded in a database 855 by application experts. If a determination is made, at step 853, that the action segment retrieved from the database 855, has less cost than the action segment produced by the target user, the description of the more efficient action may be sent to that target user. The description sent, may be displayed on the user terminal and played back over the user's device's audio means for example.

A classification of the user actions may be performed by an interpreter module 83 (FIG. 1) having an ability to understand the meaning of the user action segments. The interpretation module may include a semantic module, as described in the above referenced U.S. patent application Ser. No. 09/078,807, now U.S. Pat. No. 6,236,968 having an ability to understand the meaning of phrases typed in or spoken and of gestured. All action segments having the same goal or the same semantic meaning are classified into one class.

Figure 5:
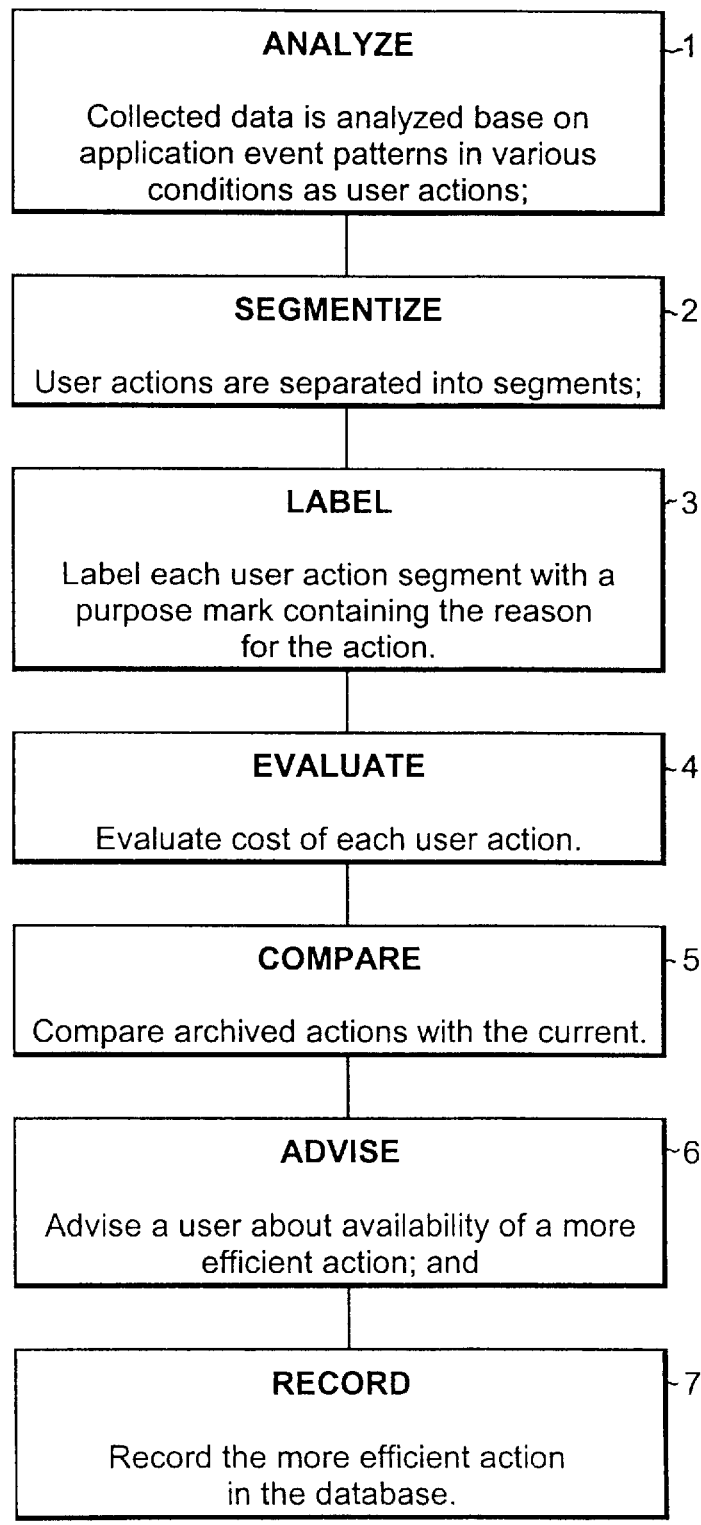
FIG. 5 is a flowchart of logical steps of the present invention for learning the optimal action and educating the user.

When users attempt to achieve a task using any of the devices connected to the inventive system, the system compares the steps followed with those saved in the database. A user is then notified if there are simpler or alternative approaches for accomplishing the same task. The initial steps or recipes may be created and stored in the database by monitoring experts experienced in the use of the software. As shown in FIG. 5, the collected data is analyzed based on application event patterns in various conditions and grouped into user actions at the analyze step 1. The user actions are then separated segments at the segmentize step 2. At the label step 3, each user action segment is labeled with a purpose mark containing the reason for the action. The step 4 evaluates cost of each user action and at step 5, the archived actions are compared with the current user action. At step 6 the user is advised about the availability of a more efficient action, and at step 7 the more efficient action is recorded in the database.

In one embodiment, the inventive system may change the graphical characteristics of icons, windows, menu items, and the like, to guide the user through efficient or alternate means of accomplishing a task. For example, if the system has determined that the task may be accomplished by selecting icon A, followed by menu item B, the system may highlight icon A and then menu item B.

In another embodiment, the inventive system may use speech synthesis or pop-up windows to guide the user, e.g., as a user moves a cursor in the vicinity of certain icons, the system may inform the user where those icons are located and may also articulate what they do. For example, where the inventive system suggests a certain approach, i.e., selecting a certain icon at a particular point during the execution of a program, as the user searches for the correct icon and the cursor is within a certain radius of the icon the invention may sound an announcement, such as, "to select the icon, please move the cursor up and to the left." The user moving the cursor towards a group of icons suggests to the inventive system that the user is interested in making a certain selection and hence is a good cue that an announcement may be helpful.

The announcing feature may also be switched off as a user option. In determining which icons should be self announcing the invention may use techniques for analyzing the nearest neighbor problems, where all the distances from the cursor to all the icons are computed and sorted. Round robin methods may also be applicable so that multiple icons may be announced in turn. Simple artificial intelligence schemes based on prior usage or based on a particular application may determine which of several nearby neighbor icons should be announced. For example, if a recipe suggests that icon B is likely to be used after icon A, than icon B will be announced when the cursor is in its vicinity. The threshold distance may be changed to suit a particular user, or a class of users, needs, or may be dynamically altered based on artificial intelligence methods.

As an aid to the user, an announced or talking icon may give a simultaneous indication of its presence by moving lips on the body of the icon. The lips may actually move according to the simultaneous speech so that lip-readers can take advantage of it. The language of the user's choice may be selected. This, announcing aspect of the invention may have a special value for the blind, visually impaired or illiterate adults and children. The announcing steps to achieve a certain action may include a closed captioning system making this invention applicable for the deaf, as well as in multimedia applications, museum and shopping mall kiosks, video games, etc.

The present invention may be applied to text processors, art programs Internet, etc. In the virtual reality systems, the user may be alerted to a suggestion of a more efficient recipe to accomplish a task. Additionally, the list of recipes may be categorized and sorted according to the age of the user, geographical location, skill of the user, date of entry, version of software, and other criteria. The database containing recipes may be stored in a proprietary format and accessed over a network.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

Having thus described our invention, what we claim as new, and desire to secure by Letters Patent is:

1. An educational method for recommending to users a most efficient technique of accomplishing tasks achievable by computing devices distributed over a network, said method comprising the steps of:

detecting actions executed by each of said users during their interaction with said computing devices to achieve one of said tasks;

comparing said actions with other actions of other users accomplishing identical tasks to determine said most efficient technique; and providing said users with descriptions of said most efficient technique.

2. The method of claim 1, wherein said network is Internet.

3. The method of claim 1, wherein said detecting step is performed by sensors.

4. The method of claim 1, wherein said tasks include one or more selected from the group consisting of: opening a window; opening a file; closing a file; executing an icon; searching performance; executing a command; switching off a device; finding a channel; and condition activation.

5. The method of claim 4, wherein said actions include one or more selected from the group consisting of: pressing keyboard keys, clicking mouse buttons, touching touch-sensitive components of said computing devices, voice commands, physical gestures, computer application operations, and appliance operations.

6. The method of claim 5, wherein said actions comprise one or more action units selected from the group consisting of: a set of keystrokes, a set of mouse movements and clicks, a set of touches of a touch sensitive device, spoken words and phrases, sounds in a spoken phrase, elementary gestures, and elementary user functions comprising zooming an icon, displaying a menu, closing files, editing functions, executing graphic facilities functions, and drawing geometric figures.

7. The method of claim 6, wherein said detecting step further comprises the steps of:

indexing and classifying said actions;

labeling each of said actions with a purpose identifier; and computing a cost for each of said actions.

8. The method of claim 7, wherein said computing step computes complexity, string length of said actions, a number of said action units, and time duration of said actions.

9. The method of claim 8, wherein said comparing step comprises the steps of:

comparing said purpose identifier; and if said purpose identifier matches, comparing said cost.

10. The method of claim 9, wherein each of said actions includes a beginning of segment to indicate a first event leading to said task and an end of segment to indicate the achievement of said task.

11. The method of claim 10, wherein said first event starts when said end of segment of a previous of said actions is reached and when said computing devices are caused to start operating.

12. The method of claim 9 wherein said actions are saved in a database of said most efficient actions if they are more efficient than said other actions having the same purpose identifier, and if no other actions having the same purpose identifier exist in said database.

13. The method of claim 12, wherein said actions are entered and modified by an expert and saved in said database.

14. The method of claim 13, wherein said providing step displays said descriptions of said most efficient technique to said users.

15. The method of claim 14, wherein a description of steps for said most efficient technique is provided when said users attempt to execute said actions.

16. A computer program storage device readable by a machine, tangibly embodying a program of instructions executable by a machine to perform method steps for recommending to users a most efficient technique of accomplishing tasks achievable by computing devices distributed over a network, said method comprising the steps of:

detecting actions executed by each of said users during their interaction with said computing devices to achieve one of said tasks;

comparing said actions with other actions of other users accomplishing identical tasks to determine said most efficient technique; and providing said users with descriptions of said most efficient technique.

17. The computer program device of claim 16, wherein said network is Internet.

18. The computer program device of claim 16, wherein said detecting step is performed by sensors.

19. The computer program device of claim 16, wherein said tasks include one or more selected from the group consisting of: opening a window; opening a file; closing a file; executing an icon; searching performance; executing a command; switching off a device; finding a channel; and condition activation.

20. The computer program device of claim 19, wherein said actions include one or more selected from the group consisting of: pressing keyboard keys, clicking mouse buttons, touching touch-sensitive components of said computing devices, voice commands, physical gestures, computer application operations, and appliance operations.

21. The computer program device of claim 20, wherein said actions comprise one or more action units selected from the group consisting of: a set of keystrokes, a set of mouse movements and clicks, a set of touches of a touch sensitive device, spoken words and phrases, sounds in a spoken phrase, elementary gestures, and elementary user functions comprising zooming an icon, displaying a menu, closing files, editing functions, executing graphic facilities functions, and drawing geometric figures.

22. The computer program device of claim 21, wherein said detecting step further comprises the steps of:

indexing and classifying said actions;

labeling each of said actions with a purpose identifier; and computing a cost for each of said actions.

23. The computer program device of claim 22, wherein said computing step computes complexity, string length of said actions, a number of said action units, and time duration of said actions.

24. The computer program device of claim 23, wherein said comparing step comprises the steps of:

comparing said purpose identifier; and if said purpose identifier matches, comparing said cost.

25. The computer program device of claim 24, wherein each of said actions includes a beginning of segment to indicate a first event leading to said task and an end of segment to indicate the achievement of said task.

26. The computer program device of claim 25, wherein said first event starts when said end of segment of a previous of said actions is reached and when said computing devices are caused to start operating.

27. The computer program device of claim 26 wherein said actions are saved in a database of said most efficient actions if they are more efficient than said other actions having the same purpose identifier, and if no other actions having the same purpose identifier exist in said database.

28. The computer program device of claim 27, wherein said actions are entered and modified by an expert and saved in said database.

29. The computer program device of claim 28, wherein said providing step displays said descriptions of said most efficient technique on said users' terminal and plays over speakers of a user computing device.

30. The computer program device of claim 29, wherein a description of steps for said most efficient technique is provided when said users attempt to execute said actions.

31. The computer program device of claim 23, wherein said computing step further computes an amount of distance a mouse is dragged.

32. The computer program device of claim 23, wherein said computing step further computes a type of input entry.

33. An educational system for recommending to users a most efficient technique of accomplishing tasks achievable by computing devices distributed over a network, said system comprising:

means for detecting actions executed by each of said users during their interaction with said computing devices in an attempt to achieve one of said tasks;

means for comparing said actions with other actions of other users accomplishing identical tasks to determine said most efficient technique; and means for providing said users with descriptions of said most efficient technique.

34. The system of claim 33, wherein said means for detecting comprises:

means for indexing and classifying said actions;

means for labeling each of said actions with a purpose identifier;

means for computing a cost for each of said action segments; and means for saving said actions in a database if they are more efficient than said other actions having the same purpose identifier, and if no other actions having the same purpose identifier exist in said database.

35. The system of claim 34, wherein said means for comparing comprises:

means for comparing said purpose identifier; and means for comparing said cost if said purpose identifier matches.

\* \* \* \* \*